United States Patent [19]

McFall

[11] Patent Number: 4,973,098

[45] Date of Patent: Nov. 27, 1990

[54] VEHICULAR WINDSHIELD FROST PREVENTIVE DEVICE

[76] Inventor: James D. McFall, 7208 W. 115th Apt. 802, Overland Park, Kans. 66210

[21] Appl. No.: 519,824

[22] Filed: May 7, 1990

[51] Int. Cl.⁵ .............................................. B60J 11/00
[52] U.S. Cl. .............................. 296/95.1; 160/370.2; 150/168
[58] Field of Search ...................... 160/370.2, DIG. 2; 150/166, 168; 296/95.1, 97.1, 97.8, 97.9, 136

[56] References Cited

U.S. PATENT DOCUMENTS

| | | | |
|---|---|---|---|
| 2,305,677 | 12/1942 | Cotton | 296/97.8 |
| 2,787,311 | 4/1957 | Cohen et al. | 296/95.1 |
| 3,263,736 | 8/1966 | Macomson | 296/95.1 |
| 3,763,908 | 10/1973 | Norman | 150/166 |
| 4,202,396 | 5/1980 | Levy | 296/97.7 |
| 4,399,347 | 8/1983 | Schmitt | 296/96.14 |
| 4,727,920 | 3/1988 | Siegler | 296/97.8 |

FOREIGN PATENT DOCUMENTS

| | | | |
|---|---|---|---|
| 2825516 | 12/1979 | Fed. Rep. of Germany | 296/97.8 |
| 0928869 | 6/1963 | United Kingdom | 150/166 |

Primary Examiner—Margaret A. Focarino
Assistant Examiner—Cathleen G. Pringle
Attorney, Agent, or Firm—Leon Gilden

[57] ABSTRACT

A frost preventive device is set forth wherein a flexible fabric sheet includes spaced side edges, including a flexible magnetic bar mounted within a complementarily configured pocket adjacent each of the side edges. The device includes spaced sections of hook and loop fasteners to permit gathering of the fabric together to accommodate vehicular windshields of narrower dimensions and accordingly permit usage of the organization upon a variety of variously configured vehicles. The device further includes an alternative embodiment utilizing a series of alternating hook and loop fastener segments with intermediate non-hook and loop portions therebetween to provide greater flexibility in usage of the device in accommodating variously configured automotive windshields. A further embodiment of the instant invention includes a series of rows of alternating hook and loop fastener patches to permit vertical and longitudinal gathering of the device, as well as providing mirror image rows of hook and loop fastener patches on each side of the sheet-like member.

4 Claims, 5 Drawing Sheets

U.S. Patent   Nov. 27, 1990   Sheet 1 of 5   4,973,098
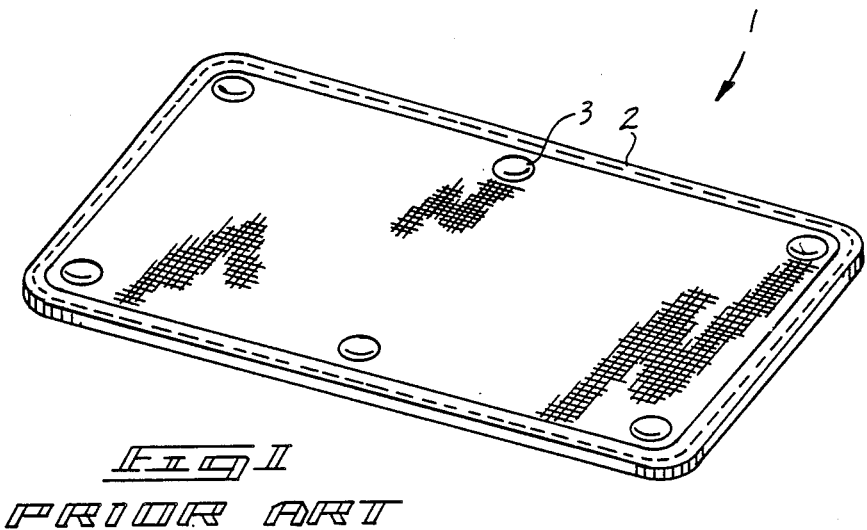
FIG 1
PRIOR ART
FIG 2
PRIOR ART
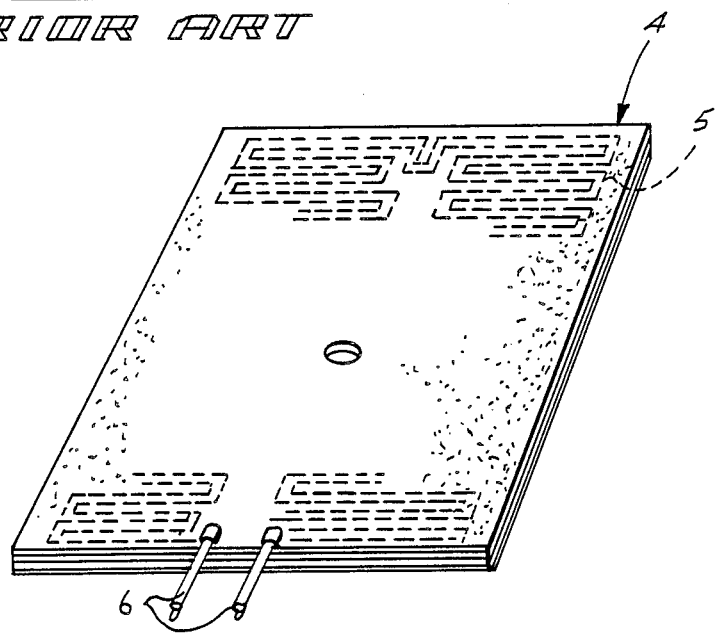

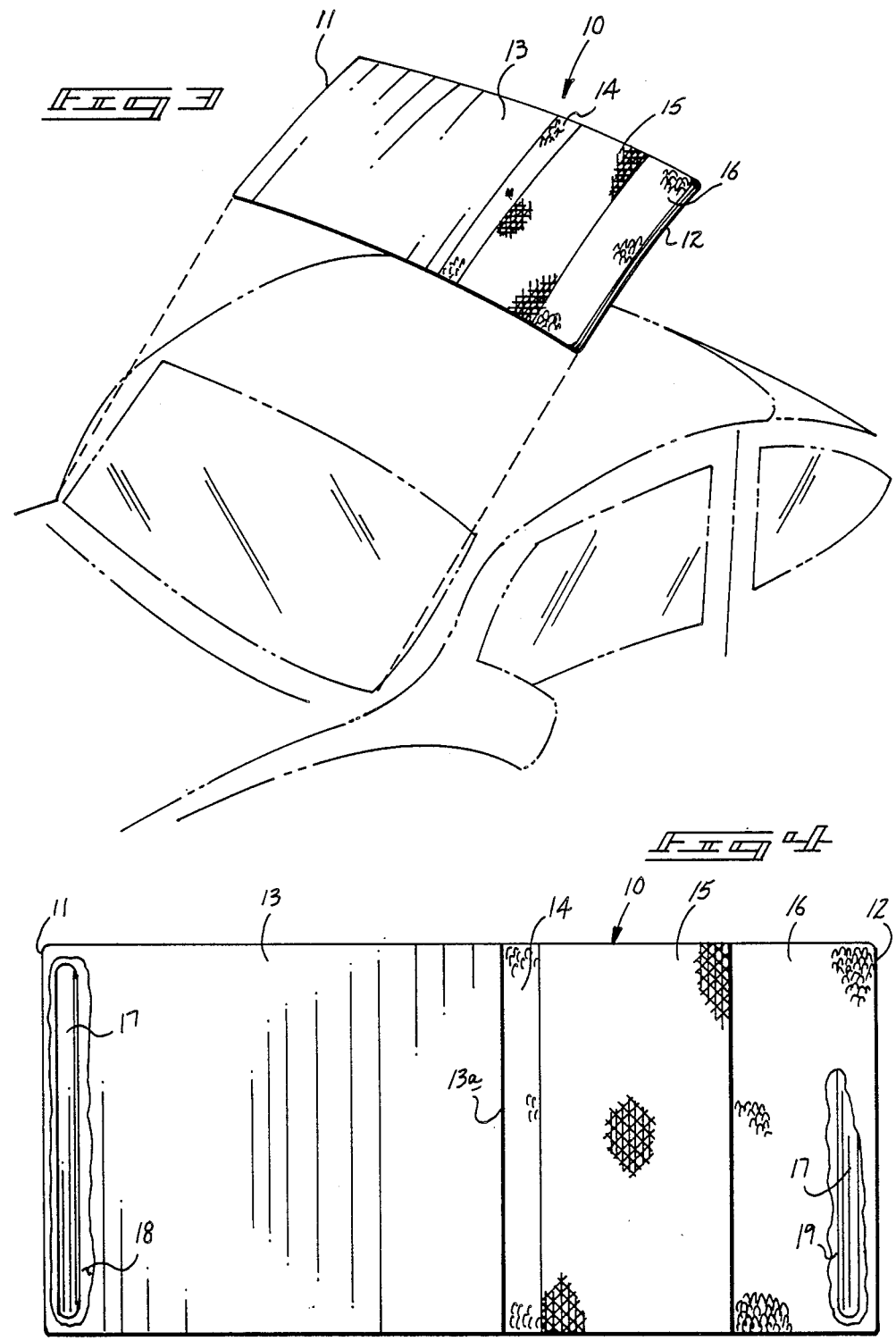

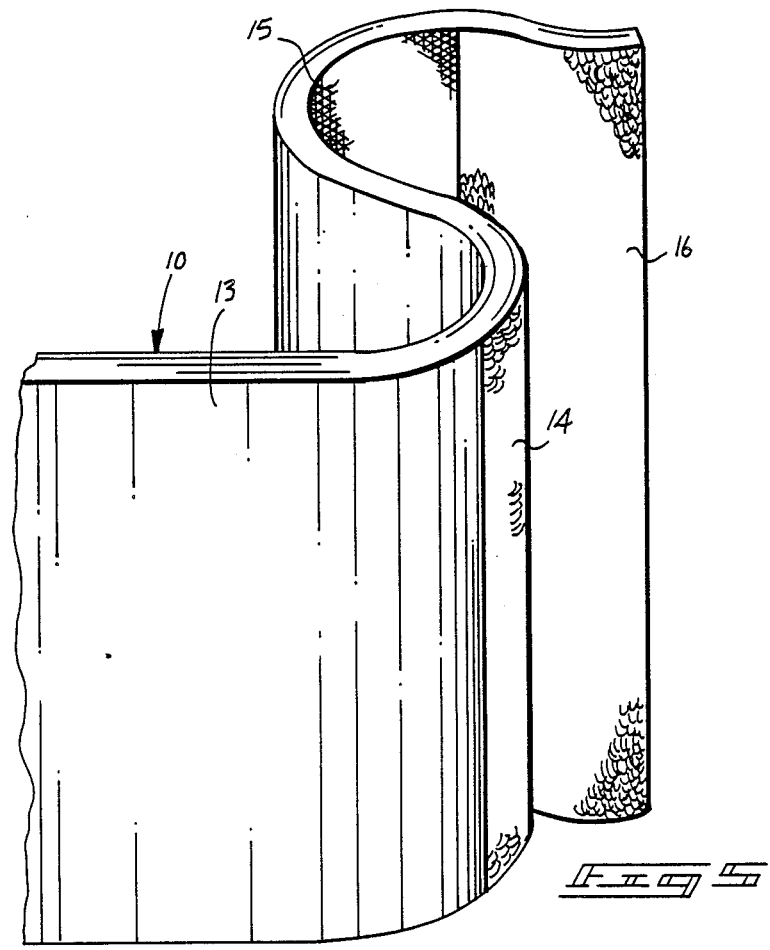
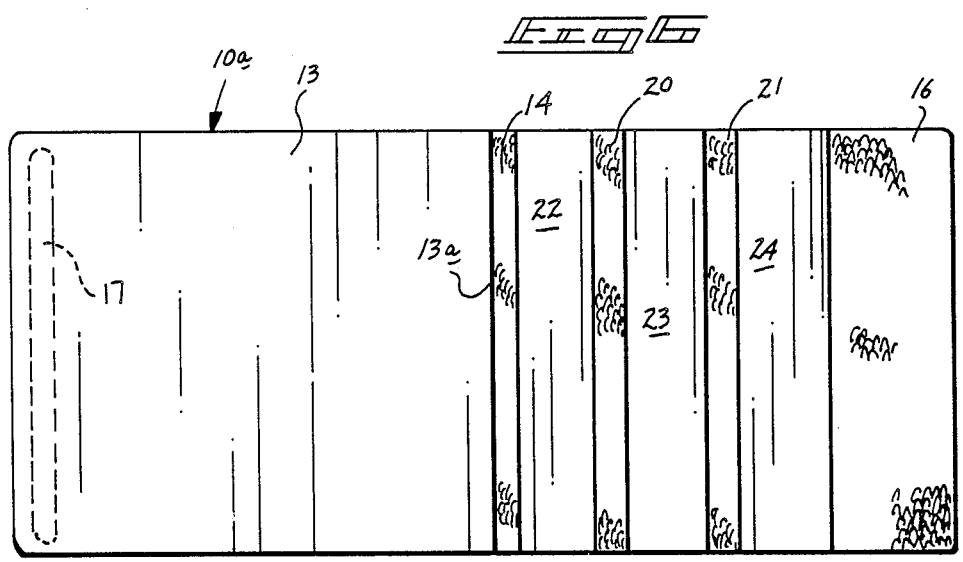

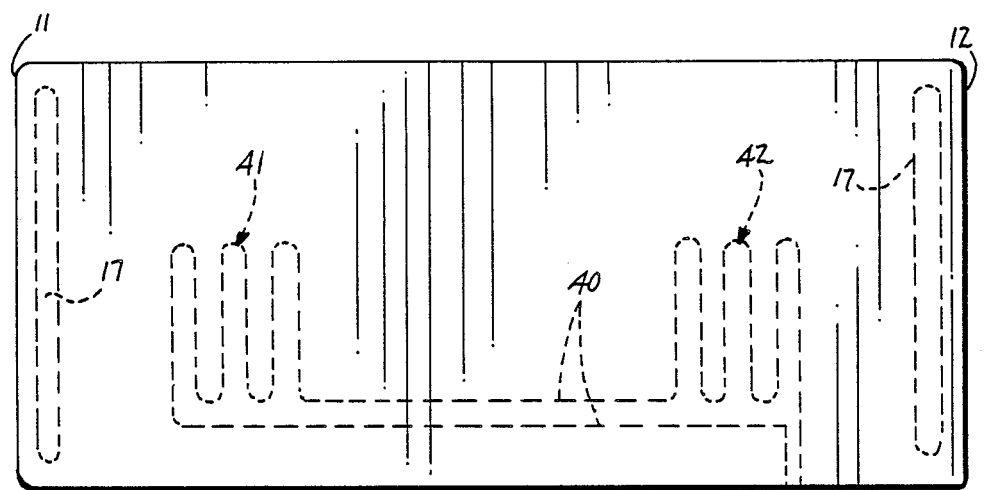
FIG 9
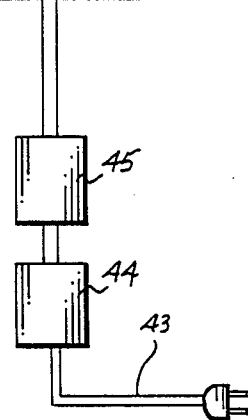
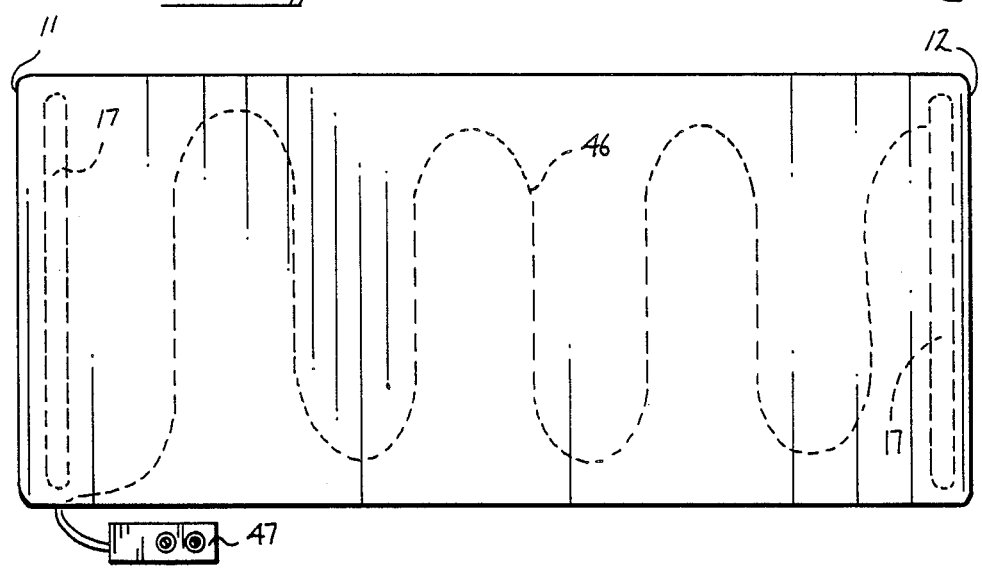
FIG 10

VEHICULAR WINDSHIELD FROST PREVENTIVE DEVICE

BACKGROUND OF THE INVENTION

1. Field of the Invention

The field of invention relates to windshield protective devices, and more particularly pertains to a new and improved vehicular windshield frost preventive device wherein the same permits positioning about variously configured windshields preventing build-up of a frost, fog, and the like thereon.

2. Description of the Prior Art

Providing frost preventive devices in association with vehicular windshields has been set forth in the prior art, but heretofore the prior art has failed to provide devices to accommodate vehicles of a variety of windshield configurations. Contemporary vehicular construction utilizes vehicular sizes and associated windshields defining a great range of vehicular windshield sizes. The instant invention attempts to overcome deficiencies of the prior art by providing a windshield protective cover selectively utilizing heating elements therewithin to prevent build-up of frost and fog upon an associated windshield. Examples of the prior art includes U.S. Pat. No. 4,399,347 to Schmitt wherein a flexible window covering for an automotive windshield includes suction of adhesive members to secure the sheet to the windshield to define an air space utilizing electrical resistance heaters to effect heating of the windshield and prevent of frost, fog, and the like.

U.S. Pat. No. 4,820,902 to Gillery provides an electrically heated transparent material utilized to overlie the vehicular windshield.

U.S. Pat. No. 4,203,198 to Hackett, et al. sets forth a heating panel defining a sandwich, including a serpentine configuration of resistance coil therewithin.

U.S. Pat. No. 4,202,396 to Levy provides a motor vehicle sunshade utilizing securement means to adhere the organization to an interior surface of the windshield.

U.S. Pat. No. 4,109,957 to Polizzi, et al. sets forth a removable automotive windshield curtain wherein an opaque cloth panel is provided to cover the vehicular windshield and side windows of a vehicle, such as recreational vehicles, utilizing a suction cup arrangement to secure the curtain to the windshield.

As such, it may be appreciated that there continues to be a need for a new and improved vehicular windshield frost preventive device as set forth by the instant invention which addresses both the problems of ease of use, as well as effectiveness in construction and in this respect, the present invention substantially fulfills this need.

SUMMARY OF THE INVENTION

In view of the foregoing disadvantages inherent in the known types of vehicular windshield covers now present in the prior art, the present invention provides a vehicular windshield frost preventive device wherein the same provides a flexible fabric curtain utilizing a pattern of hook and loop fasteners to permit adjustment of the curtain to accommodate vehicular windshields of various configurations. As such, the general purpose of the present invention, which will be described subsequently in greater detail, is to provide a new and improved vehicular windshield frost preventive device which has all the advantages of the prior art vehicular windshield covers and none of the disadvantages.

To attain this, the present invention provides a frost preventive organization wherein a flexible fabric sheet includes spaced side edges, including a pocket adjacent each of the side edges. The device includes spaced sections of hook and loop fasteners to permit gethering of the fabric together to accommodate vehicular windshields of narrower dimensions and accordingly permit usage of the organization upon a variety of variously configured vehicles. The device further includes an alternative embodiment utilizing a series of alternating hook and loop fastener segments with intermediate non-hook and loop portions therebetween to provide greater flexibility in usage of the device in accommodating variously configured automotive windshields. A further embodiment of the instant invention includes a series of rows of alternating hook and loop fastener patches to permit vertical and longitudianl gathering of the device, as well as providing mirror image rows of hook and loop fastener patches on each side of the sheet-like member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

It is another object of the present invention to provide a new and improved vehicular windshield frost preventive device which may be easily and efficiently manufactured and marketed.

It is a further object of the present invention to provide a new and improved vehicular windshield frost preventive device which is of a durable and reliable construction.

An even further object of the present invention is to provide a new and improved vehicular windshield frost preventive device which is susceptible of a low cost of manufacture with regard to both materials and labor, and which accordingly is then susceptible of low prices of sale to the consuming public, thereby making such vehicular windshield frost preventive device economically available to the buying public.

Still another object of the present invention is to provide a new and improved vehicular windshield frost preventive device wherein the same utilizes alternating portions of hook and loop fasteners to permit securement of opposing portions of a covering sheet together to accommodate variously configured automotive windshields.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art vehicular windshield cover.

FIG. 2 is an isometric illustration of a resistance heating element in a sheet-like configuration.

FIG. 3 is an isometric illustration of the instant invention for association with a vehicular windshield.

FIG. 4 is an orthographic top view of the instant invention.

FIG. 5 is an isometric illustration of the instant invention in a gathered orientation to accommodate variously configured windshields.

FIG. 6 is an orthographic top view of a modification of the instant invention.

FIG. 9 is an orthographic top view of the instant invention utilizing a predetermined pattern of resistance heating elements positioned therewithin.

FIG. 10 is an orthographic top view of a modified resistance heating pattern utilized by the instant invention.

DESCRIPTION OF THE PREFERRED EMBODIMENT

Figure 7:
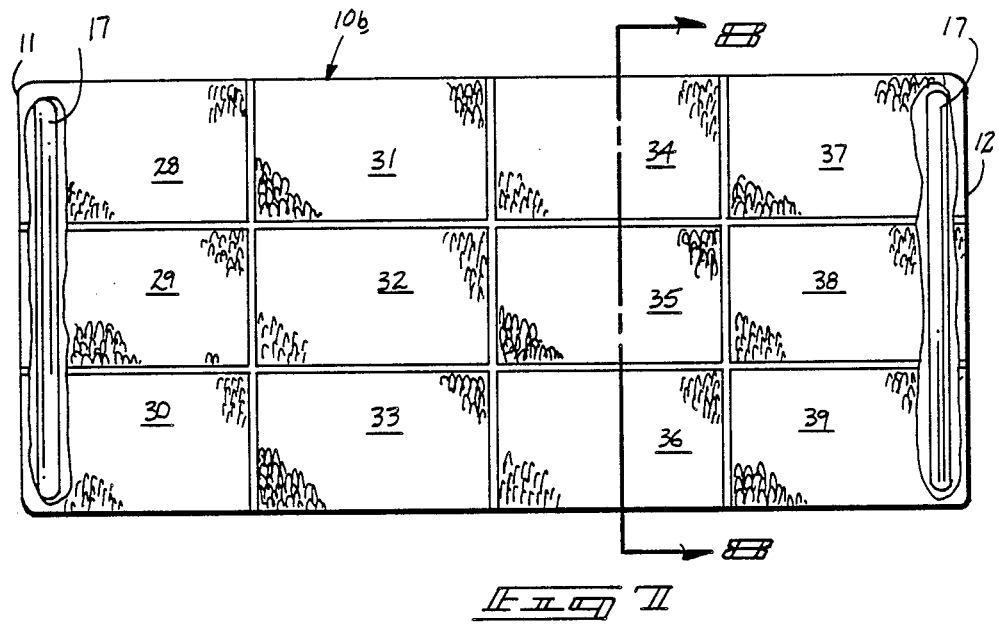
FIG. 7 is an orthographic top view of a further modification of the instant invention.
Figure 8:
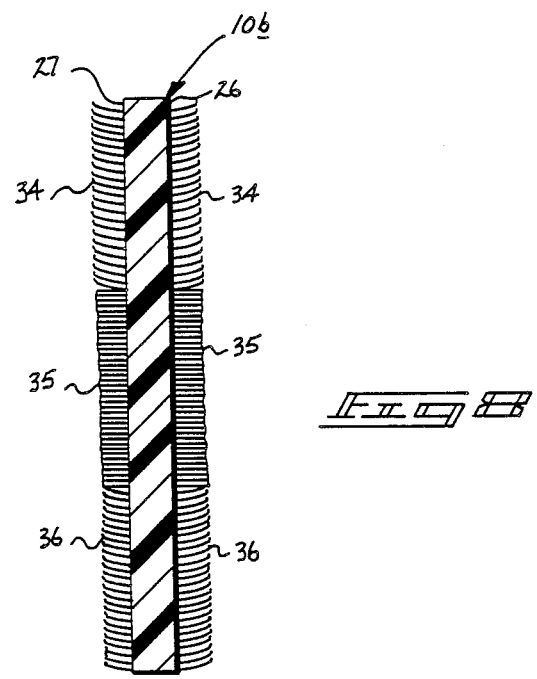
FIG. 8 is an orthographic view, taken along the lines 8—8 of FIG. 7, in the direction indicated by the arrows.

With reference now to the drawings, and in particular to FIGS. 1 to 10 thereof, a new and improved vehicular windshield frost preventive device embodying the principles and concepts of the present invention and generally designated by the reference numerals 10, 10a, and 10b will be described.

FIG. 1 is an isometric illustration of a prior art windshield protective cover 1, including flexible sheet member 2, including securement means 3 set forth as suction cups or adhesive portions for securement of the device to an interior surface of a windshield. FIG. 2 illustrates a further prior art device 4 utilizing a pattern of heating resistance elements 5 formed therewithin receiving electrical energy through exteriorly directed connectors 6.

More specifically, as shown in FIGS. 3-5 the vehicular windshield frost preventive device 10 of the instant invention essentially comprises a fluid impermeable sheet-like member formed of a polymeric or nylon-like fabric base, including spaced parallel edges defined by a first side edge 11 spaced from and parallel to a second side edge 12. A fabric sheet portion 13 extends from the first side edge 11 interiorly towards the second edge and extends a distance substantially one-half to three-fourths of a predetermined length defined by the fabric sheet member. A first fabric hook fastener strip 14 extends parallel to the first and second side edges 11 and 12 and orthogonally between the top and bottom edges of the fabric sheet and is contiguous with an interior edge 13a of the fabric sheet portion 13. An intermediate fabric surface 15 extends between the first fabric hook and loop fastener strip 14 and is spaced from the second side edge 12, wherein a fabric loop fastener strip 16 is formed coextensively between the intermediate fabric surface 15 and the second side edge 12. An elongate flexible bar 17 is mounted parallel to each side edge and essentially coextensive therewith and received within a complementarily formed pocket defined by a first elongate pocket 18 formed adjacent the first side edge and a second elongate pocket 19 formed adjacent the second side edge. Reference to FIG. 5 illustrates that the first fabric hook fastener strip 14 is accordingly securable to the fabric loop fastener strip 16 to permit a "gathering" of the longitudinal predetermined length of the device 10 and thereby shorten the predetermined length to accommodate narrower windshields.

FIG. 6 illustrates the use of the first fabric hook fastener strip 14 mounted to the innermost edge 13a of the first fabric surface 13, as well as a spaced second and third hook fastener strip 20 and 21 respectively. The second and third hook fastener strips 20 and 21 are defined by a predetermined width substantially equal to that of a predetermined width defined by the first fabric hook and loop fastener strip 14 and include spaced first, second, and third intermediate fabric surfaces 22, 23, and 24 intermediate the first and second fabric hook fastener strips 14 and 20, with the second intermediate fabric surface 23 positioned between the second and third fabric hook fastener strips 20 and 21, and the third intermediate fabric surface 24 positioned between the third fabric hook fastener strip 21 and the fabric loop fastener strip 16 to provide a greater selective usage of a hook fabric surface in association with the loop surface 16 for adjustment of the predetermined length of the sheet member in use. It is noted that the intermediate surfaces 22, 23, and 24 are each of an equal width and are formed coextensively and contiguously between the various hook fastener strips, as illustrated.

FIG. 7 illustrates a further modified device 10b, wherein between the first and second side edges 11 and 12 and the elongate flexible magnetic bars 17, provides a pattern defined by parallel rows and columns of alternating hook and loop fastener patches. Further, the rows and columns are formed on each surface of the fabric sheet defining the device 10b, wherein the first surface 26 and the opposed second surface 27 each include mirror image patterns of the hook and loop fastener patches. A first column of hook fastener patches include a first fastener patch 28, a second fastener patch 29, and a third fastener patch 30 arranged underlying each other in an aligned column. A second column defines a first loop fastener patch 31, a second loop fastener patch 32, and a third loop fastener patch 33 aligned with and underlying each other and positioned adjacent each of the respective first, second, and third hook fastener patches 28, 29, and 30. A third column defines a fourth hook fastener patch 34, a fifth hook fastener patch 35, and a sixth hook fastener patch 36. A fourth column defines a fourth loop fastener patch 37, a fifth loop fastener patch 38, and a sixth loop fastener patch 39. It is noted that each of the hook and loop fastener patches 28-39 define an equal surface area and thereby permits selective shortening of the predetermined length of the fabric sheet in a myriad of patterns to accommodate variously configured automotive windshield surfaces to be protected.

FIGS. 9 and 10 illustrate the use of heating coil elements provided within the organization, wherein FIG. 9 illustrates the use of an intermediate portion of heating coils defined by intermediate low density coils 40 positioned between a first and second high density coil group 41 and 42 to direct heating to portions of an automotive windshield overlying the respective passenger and driver compartments to direct heating energy to those portions. An electrical cord 43 directs electrical energy through a timer mechanism 44 and a rheostat 45 of conventional construction in the electrical art. FIG. 10 illustrates a sinusoidal resistance heating coil pattern 46 directed through the sheet member utilizing a rechargeable battery pack 47 for use where access to household type alternating current is not available.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular windshield frost preventive device comprising,
   an elongate flexible sheet member formed of a fluid impermeable fabric, the sheet member including a first side edge spaced from and parallel to a second side edge, and a top edge spaced from and parallel to a bottom edge, and
   a first pocket formed within the sheet member adjacent the first side edge, and a second pocket formed in the sheet member adjacent the second side edge, the first and second pockets arranged coextensively with the first and second side edges respectively, and
   an elongate flexible magnetic bar complementarily received within each first and second pocket, and
   a first surface extending from the first side edge interiorly of the sheet to an interior edge, the interior edge spaced from the second side edge and arranged generally orthogonally between the top edge and the bottom edge of the sheet member, and
   hook and loop fastener means mounted between the interior edge and the second side edge to permit securement of the second side edge relative to the interior edge and permit shortening of an effective length defined by a distance between the first side edge and the second side edge.

2. A device as set forth in claim 1 wherein the hook and loop fastener means includes a first fabric hook fastener strip formed contiguously of the interior edge and directed orthogonally between the top edge and the bottom edge of the sheet member, wherein the first fabric hook fastener strip is defined by a first width, and the hook and loop fastener means further including a fabric loop fastener strip spaced from the first fabric hook fastener strip and extending from the second side edge to a position spaced from the first fabric hook and loop fastener strip, and an intermediate fabric surface extending between the first fabric hook fastener strip and the fabric loop fastener strip.

3. A device as set forth in claim 2 further including a second fabric hook fastener strip extending between the top edge and the bottom edge of the sheet member and spaced from the first fabric hook fastener strip and the fabric loop fastener strip, and a third fabric hook fastener strip extending between the top edge and the bottom edge of the sheet member and spaced from the second fabric hook fastener strip and the fabric loop fastener strip, wherein the first, second, and third fabric hook fastener strips are arranged parallel relative to one another, and wherein the second and third fabric hook fastener strips are positioned overlying the intermediate fabric surface.

4. A device as set forth in claim 3 including a flexible fluid impermeable fabric sheet member, the sheet member including a first side edge spaced from and parallel to a second side edge, and top edge spaced from and parallel to a bottom edge, and including a first surface and an opposed second surface, the first and second surfaces each include at least four alternating columns of hook and loop fastener members, the hook and loop fastener members include a first column, including a first, second, and third hook fastener patch, and a second column including a first, second, and third loop fastener patch, and a third column including a fourth, fifth, and sixth hook fastener patch, and a fourth column including a fourth, fifth, and sixth loop fastener patch, wherein each column is defined by a substantially equal width, and the first surface and the second surface each include a first, second, third, and fourth column of alternating hook and loop fastener patches.

* * * * *